Nov. 25, 1952 H. KORSHAK 2,619,160
LIQUID FUEL BURNER STRUCTURE FOR VEHICLE HEATERS
Filed May 25, 1949 3 Sheets-Sheet 1
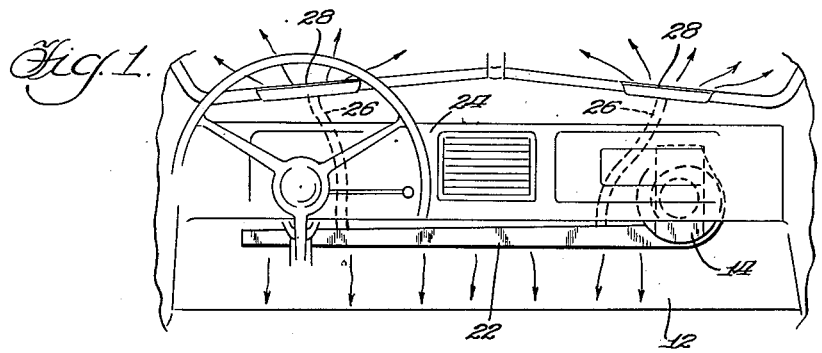
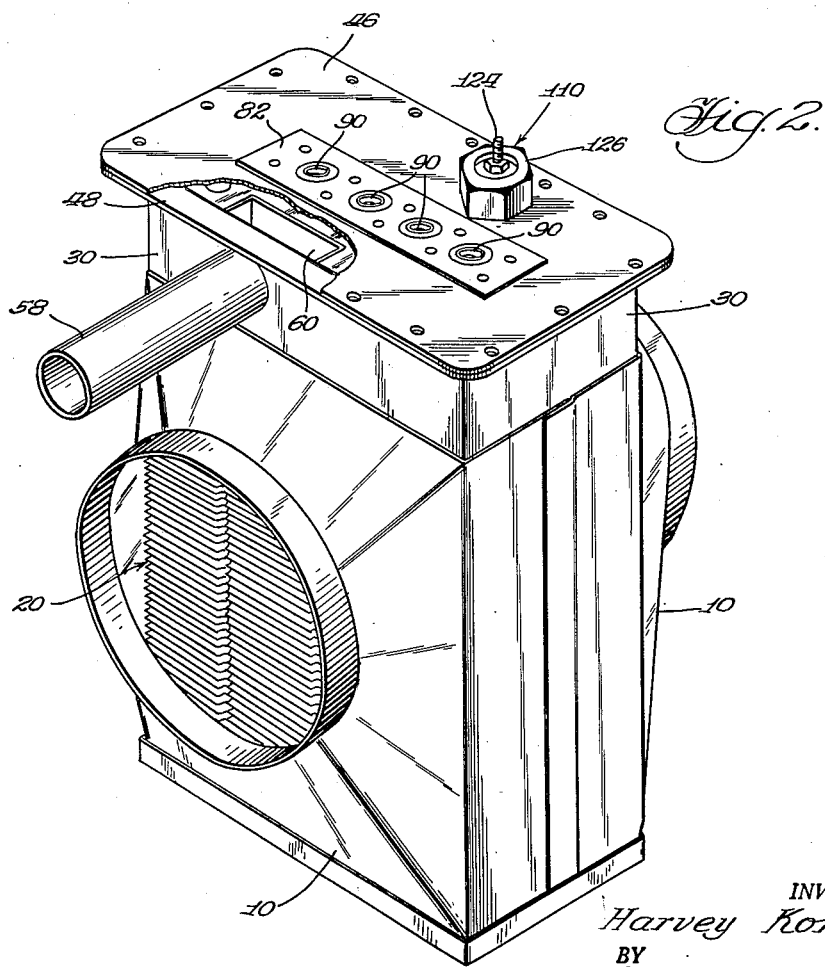
INVENTOR.
Harvey Korshak
BY
Foorman L. Mueller
Atty.

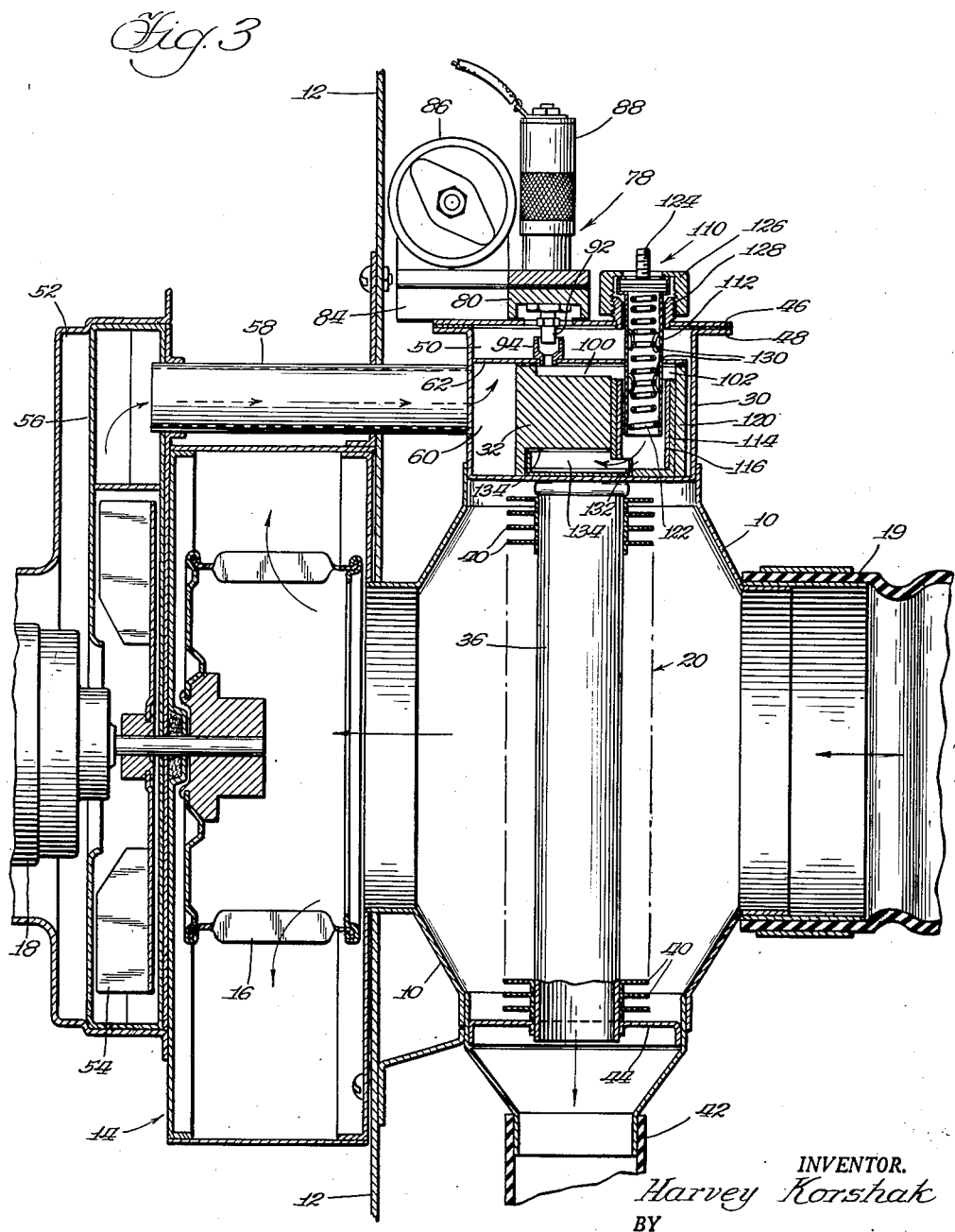

Nov. 25, 1952 H. KORSHAK 2,619,160
LIQUID FUEL BURNER STRUCTURE FOR VEHICLE HEATERS
Filed May 25, 1949 3 Sheets-Sheet 3
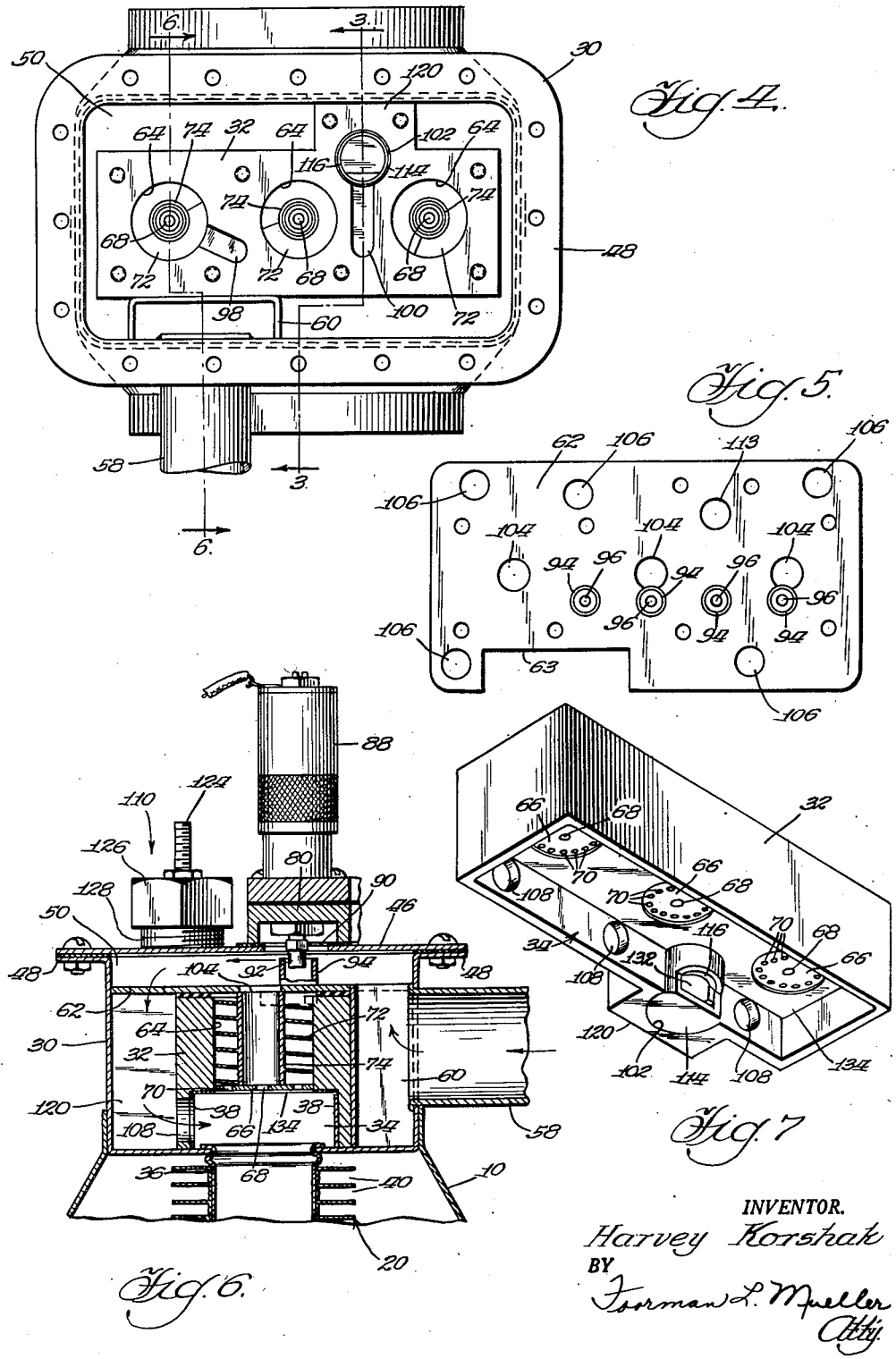
INVENTOR.
Harvey Korshak
BY
Foorman L. Mueller
Atty.

Patented Nov. 25, 1952

2,619,160

UNITED STATES PATENT OFFICE 2,619,160

LIQUID FUEL BURNER STRUCTURE FOR VEHICLE HEATERS

Harvey Korshak, Chicago, Ill., assignor to Motorola, Inc., Chicago, Ill., a corporation of Illinois Application May 25, 1949, Serial No. 95,335

10 Claims. (Cl. 158—28)

This invention relates to fuel-burning heaters for heating the passenger compartments of automobiles and other relatively small spaces, and it is concerned particularly with improvements in small, lightweight, high-capacity heaters of the character disclosed, for example, in the copending applications of Stanley J. Budlane, Serial Nos. 2,439, filed January 15, 1948, which application has now been issued as Patent No. 2,588,-352, dated March 11, 1952; 43,921, filed August 12, 1948, and 52,169, filed October 1, 1948, which two pending applications are both assigned to the same party as the present one.

Heaters of the aforesaid character make extensive use of relatively cheap, lightweight metal parts. Such parts are susceptible to damage by overheating; hence this type of structure preferably should be so designed that the heat is more or less uniformly distributed throughout the structure and is not concentrated in any one spot. At the same time, the design should be such that efficient combustion is insured.

An object of the present invention is to provide an improved heater of the aforesaid character having a novel arrangement of parts for the above-stated purposes.

A further object is to simplify the heater construction and make is easier to service.

As a feature of the invention, I provide an assembly comprising a fuel vaporizer block, a sheet metal receptacle for said block, and an associated tubular heat exchanger, wherein said heat exchanger and one face of said block adjoin a wall of said receptacle on opposite sides of an opening or openings in said wall. The receptacle contains said block and defines a plenum chamber for combustion-supporting air. The block has vaporizing passages extending through it for conducting liquid fuel and air through the block and forming the same into combustible mixtures. In said one face of the block there is a recess affording a common exit for all of said vaporizing passages. Combustion of the fuel takes place within this recess, and the combustion products pass immediately into the heat exchanger ducts which are in direct communication with said recess.

Another feature is the provision of helical vaporizing elements in the vaporizing passages of the block which are so arranged that the whirling motion imparted to the fuel and air mixture by each of these vaporizing elements continues as the mixture emerges from its vaporizing passage into the recess. In this way the flames of the burning fuel and air mixture are given a spiral whirling motion which makes them self-piloting. This is further accentuated by the confinement of the flames within the recess while the fuel and air mixtures are being ignited therein.

Another feature is the arrangement of a fuel metering assembly on the cover of the receptacle, with suitable aspirating devices being disposed on a plate within the receptacle below the cover. This arrangement affords a substantially straight-line movement of fuel and air into and through the vaporizer block, and it is easily disassembled for access to the vaporizer block.

The foregoing and other objects and features of the invention will be better understood from a study of the following description taken in connection with the drawings, wherein:

Fig. 1 partially illustrates, in elevation, the dash section of an automobile equipped with a heater in accordance with the invention;

Fig. 2 is a perspective view showing the main portion of a heater embodying the principles of the invention;

Fig. 3 is a vertical sectional view of the complete heater installation, the section being taken on the line 3—3 in Fig. 4;

Fig. 4 is a plan view of the heater with certain parts removed therefrom to show the interior of the plenum chamber and the fuel vaporizing means disposed therein;

Fig. 5 is a plan view of a plate which is adapted for use with the structure shown in Fig. 4;

Fig. 6 is a vertical sectional view taken on the line 6—6 of Fig. 4 and showing certain parts which are omitted from that view; and Fig. 7 is a bottom perspective view of the vaporizer block used in the illustrated heater.

In practicing the invention, the heater unit is provided with a hollow sheet metal receptacle, to the bottom of which a heat exchanger is directly secured. A vaporizer block of small compact form is disposed in the receptacle immediately adjoining the bottom wall thereof. Fuel vaporizing passages extend vertically through this block from a plenum chamber on the upper side of the block to the lower side of the block substantially in alignment with vertically extending tubular duct means in the heat exchanger. In the lower side of the block there is a recess affording a common exit for all of the vaporizing passages. Combustion air is supplied to the plenum chamber within the receptacle, and liquid fuel is supplied through suitable aspirators to the fuel vaporizing passages by a fuel metering assembly which is mounted on the cover of the receptacle. Provisions are made for heating the vaporizer block either by a special starting means or by the heat of the burning fuel after combustion is established. Helical vaporizing elements are disposed in the vaporizing passage to impart a spiral motion to the fuel and air. The liquid fuel is vaporized in the passages and is mixed with air therein to form a spirally whirling combustible mixture which is ignited in the recess at the bottom of vaporizer block. The combustion products pass into the heat exchanger ducts, which communicate directly with said recess through the bottom of the receptacle.

The heater unit illustrated in Fig. 2 has a sheet metal housing 10 which is mounted in any suitable fashion on the engine side of the fire wall 12 that separates the passenger compartment from the engine compartment of the vehicle. A blower unit 14 which communicates with the interior of the housing 10 is mounted on the passenger side of the fire wall 12 as indicated in Figs. 1 and 3. The blower unit 14 includes a blower 16, Fig. 3, powered by an electric motor 18. When the blower 16 is operating it draws fresh air through a duct 19 into the housing 10, where the air contacts a heat exchanger 20, and the heated air then is discharged by the blower 16 into a warm air duct as 22, Fig. 1, which extends laterally across the fire wall 12 beneath the dash or instrument panel 24. Portions of the warm air may be diverted through conduits 26 to the windshield defrosters 28.

This heating system is of the pressurized type which maintains the interior of the vehicle at a slightly higher pressure than the surrounding atmosphere. The motion of the vehicle may be utilized to assist this pressurizing action of the blower, in a well-known manner, or the blower may be dispensed with altogther and the motion of the vehicle relied upon to create the desired pressure. Obviously the illustrated heater is not confined in its application to any particular type of heating system, however. It could be used also in a system where the air within the vehicle is recirculated, provided suitable provisions are made for passing the recirculated air into contact with the heat exchanger.

A small, box-like, sheet metal receptacle 30, Figs. 3, 4 and 6, is secured to the upper end of the housing 10. Within this receptacle 30 is positioned a small, compact vaporizer block 32 (shown best in Figs. 4, 6 and 7) which is composed mainly of a solid metal such as cast aluminum. This is the only casting employed in the heater structure as described thus far. The block 32 is secured in a suitable fashion to the bottom of the receptacle 30, and the bottom face of the block 32 is recessed, as indicated at 34, for a purpose which will be explained presently. The heat exchanger 20 comprises a series of tubular ducts 36 which extend through openings in the bottom wall of the receptacle 30 and are secured thereto in a suitable manner as shown. These ducts 36 communicate with the aforesaid space or recess 34 and extend vertically downward therefrom. Locating flanges 38, Fig. 6, or the like at the bottom of the receptacle 30 are receivable in the recess 34 of the vaporizer block 32 to position this block directly above the duct 36. The arrangement of the receptacle 30, vaporizer block 32 and heat exchanger ducts 36 just described is an important feature of the present invention, the advantages of which will be pointed out hereinafter.

The heat exchanger ducts 36 are provided with radiating fins 40 to expedite the transfer of heat from the ducts to the air which flows through the housing 10. The ducts 36 are made of suitable heat-resistant material such as steel coated with a ceramic lining. Baffles (not shown) may be inserted within these ducts for increased efficiency if desired. At their lower ends the ducts 36 communicate with an exhaust pipe 42, Fig. 3, which is attached to the bottom of the housing 10. A plate 44 secured to the housing rigidly supports the lower ends of the ducts.

A cover plate 46, Figs. 2, 3 and 6, extends across the top of the receptacle 30 and is secured to a marginal flange 48 around the upper edge of this receptacle. The space between the cover 46 and the vaporizer block 32 constitutes a plenum chamber 50 for incoming air to support the combustion of fuel in the heater. Air from the engine compartment of the vehicle is admitted through a suitable duct (not shown) to the interior of a scroll 52, Fig. 3, included in the blower unit 14. A second blower 54 actuated by the motor 18 draws this air into the interior of another scroll 56 and thence impels the air through a tube 58, Figs. 2, 3 and 6, which tube extends through the fire wall 12 and communicates with the interior of the receptacle 30. Within the receptacle 30 the air discharged by the tube 58 is reflected upwardly by a small baffle 60 to the plenum chamber 50. There the incoming air is initially confined between the cover 46 and a plate 62 (best shown in Fig. 5) parallel to this cover which is secured to the top of the vaporizer block 32. A rectangular cut-out 63, Fig. 5, in the edge of the plate 62 accommodates the baffle 60.

Vertically extending holes 64, Figs. 4 and 6, are provided in the vaporizer block 32. In the present embodiment of the invention there are three of these holes 64, and each is located substantially in vertical alignment with one of heat exchanger ducts 36, of which there are three. The bottom of each hole 64 is partially closed by a perforated disc 66 which may be of the same material as the vaporizer block 32 or of a more heat-resistant material if desired. Each disc 66 has a central opening 68 therein and other holes 70 which are arranged in a circle near the edge of the disc, this being shown best in Fig. 7.

Disposed within each of the fuel vaporizing passages 64 is a helical vaporizer 72 which is made of a highly heat-conductive material such as copper. Preferably the vaporizers 72 are short lengths of extruded copper stock comprising a central tubular portion 74 surrounded by a helical fin portion. The outer edge of the helical fin is in close contact with the wall of the vaporizing passage 64.

Mounted on the cover 46 of the receptacle 30 is a fuel metering assembly 78, Fig. 3. The assembly 78 has a base member 80, the under face of which is recessed, and this base member 80 is mounted on a gasket 82, Fig. 2, on the upper face of the cover 46. An extension 84 of the base member 80 supports an electromagnetic fuel pump and pressure regulating device 86. The construction of such devices are well-known; hence a detailed description thereof is not presented herein. Electromagnetic solenoid valves 88, of which there are four in the present instance (two of them being shown respectively in Figs. 3 and 6) are arranged on the fuel metering assembly 78 in vertical alignment with holes 90 (Fig. 2) in the cover 46. A fuel outlet orifice 92, Figs. 3 and 6, extends downwardly from the base member 80 beneath each solenoid valve 88. The solenoid valves 88 control the feeding of liquid fuel by the pump and pressure regulating device 86 through the several orifices 92. When the corresponding solenoid 88 is energized, liquid fuel such as gasoline is allowed to pass through the associated orifice 92. When the solenoid is not energized, the flow of fuel to the orifice is shut off.

Mounted on the upper face of the plate 62, Figs. 5 and 6, are four aspirators 94. Each of these aspirators 94 consists of a short, tubular member surrounding a small hole 96 in the plate 62. The aspirators 94 are respectively disposed in vertical alignment with the fuel orifices 92. Each orifice 92 is considerably smaller in diameter than the inside of the associated aspirator, and it extends part of the way down into the aspirator, as shown in Figs. 3 and 6. Two of the aspirators 94 are positioned directly above portions of the helical fins of the two right-hand vaporizers 72, Fig. 4. Another of the aspirators 94 (the most left-hand one as viewed in Fig. 5) communicates with a short channel 98 formed in the upper face of the vaporizer block 32, which channel extends to the left-hand vaporizer passage 64, Fig. 4. The remaining aspirator 94 communicates with a channel 100, Figs. 3 and 4, in the upper face of the block 32, which channel extends to a vertical hole 102 in the block 32. This hole 102 receives a portion of an igniter device which will be described presently.

When the heater is in operation, a certain amount of air pressure is built up in the plenum chamber 50. Portions of the air enter the aspirators 94, and if any of the fuel valves controlled by the solenoid devices 88 are open, the fuel enters the aspirators along with the air. Air also passes through holes 104 (Fig. 5) in the plate 62, which holes register with the tubular portions 74 of the vaporizers 72. The air which enters the aspirators 94 will be referred to herein as primary air, while the air entering the tubular center portions 74 of the vaporizers 72 will be referred to as secondary air. Air from the plenum chamber 50 also passes through holes 106 (Fig. 5) in the plate 62, building up a certain amount of air pressure in the space surrounding the lateral sides of the vaporizer block 32. This space may be considered an auxiliary plenum chamber. Holes 108, Figs. 6 and 7, extend through a thin wall portion at the bottom of the vaporizer block 32 and also through the flange 38 adjoining thereto, thus supplying tertiary or supplemental air to the space 34.

An electrical igniter 110, Figs. 2 and 3, is employed to establish combustion of the fuel and to heat the vaporizer block 32 when the heater is first placed in operation from a cold state. The igniter 110 is mounted on the cover 46 and includes a metallic tube 112 which extends downwardly through a hole 113 (Fig. 5) in the plate 62 into the hole 102 in the vaporizer block 32. Within the hole 102 is positioned a sleeve-like metallic plug 114 within which is disposed a liner 116 of brass or other suitable material. In order to accommodate the hole 102, which must be located near one side of the receptacle 30, the vaporizer block 32 has a lateral extension 120 as shown in Figs. 4 and 7.

Within the igniter tube 112 there is a coil of resistance wire 122, Fig. 3, which is fairly heavy and rigid. The upper end of this coil 122 is connected to an insulated terminal 124. The lower end of the coil 122 is bonded directly to the lower end of the tube 112 so as to make a ground connection therewith. The igniter 110 is supported by a mounting nut 126 adapted to screw onto a threaded boss 128 secured to the cover 46.

The igniter tube 112 has holes 130 (Fig. 3) therein, some of which are located above the plate 62 and others below this plate. Air from the plenum chamber 50 enters the interior of the tube 112 through the upper holes 130 and passes downwardly through the tube and through the open end at the bottom thereof. When the igniter coil 122 is energized, the heat from this coil raises the temperature of the air in the tube 112. If there is any fuel in the passage 100 (as there will be when the heater is being started) such fuel comes into contact with the heated igniter tube 112 and is vaporized thereby and mixed with the heated air. The coil 122 attains a sufficient temperature when energized to ignite the fuel and air mixture at the lower end of the igniter. The plug 114 is closed at the bottom thereof, and an opening 132 (Figs. 3 and 7) extends laterally through the plug 114 to the space 34 beneath the vaporizer block 32 directly above the heat exchanger tubes 36. The portions of the vaporizer block 32 adjacent to the space 34 are protected against flames by the above described flanges 38 and by a thin steel plate 134, Figs. 3 and 6, which covers those areas of the bottom surface of block 32 exclusive of the discs 66, Fig. 7.

The heat from the igniter flame rapidly raises the temperature of the vaporizer block 32, and when the block is sufficiently warm to vaporize liquid fuel in the vaporizing passages 64, one of the solenoid valves 88 is energized. Preferably this would be the valve controlling the admission of liquid fuel to the center one of the three vaporizing passages 64. The liquid fuel is drawn into the center vaporizer 72 through the corresponding aspirator 94. The heat of the vaporizer block 32 is transferred to the vaporizer 72, causing the liquid fuel to vaporize and mix with the primary air that enters the vaporizing passage by way of the aspirator 94. The fuel and the primary air pass through an extended, tortuous path defined by the helical fin of the vaporizer 72. As the fuel and air mixture emerges through the openings 70 (Fig. 7) at the bottom of the vaporizing passage, it is ignited by the flame from the igniter 110, which is directed into the space 34. Secondary air emerging through the opening 68, and tertiary air passing through the openings 108, help to support combustion of the fuel. In this way a pilot flame is established.

Due to the whirling action imparted to the combustible mixture by the vaporizer 72 a portion of the pilot flame tends to spread laterally and circulate about in the space 34 momentarily before passing into the ducts 36. This circulating action tends to keep the flame close to the mouth of the vaporizing passage where there is an adequate supply of combustible mixture, so that there is no likelihood of the flame being blown out accidentally. When the pilot flame has been established, the igniter 110 may discontinue operating, and thereafter the pilot flame maintains or helps to maintain the vaporizer block 32 heated.

As demands for heat are made upon the heater, one or both of the remaining solenoid valves 88 may be energized, and as either of these valves is energized, it admits liquid fuel to the corresponding vaporizer 72 in one of the two outer vaporizing passages 64, shown in Fig. 4. These outermost vaporizing passages 64 may be supplied with liquid fuel intermittently as the demand upon the heater fluctuates. The center vaporizing passage 64, however, is supplied with liquid fuel continuously while the heater is operating, thereby maintaining a continuous pilot flame within the combustion space 34. Whenever liquid fuel is admitted to either or both of the vaporizing passages 64, such fuel is vaporized therein and mixed with air to form a combustible mixture, and the combustible mixture is ignited by the pilot flame within the space 34.

As has been mentioned above, the flames issuing from the vaporizing passages 64 are given a whirling motion which causes portions of the flames to spread out within the space 34 before entering the heat exchanger ducts 36. The space 34 thus serves as an equalizing chamber which tends to maintain a uniform distribution of combustion products among the several ducts 36 and tends to prevent the flames from blowing out. It also prevents uneven heating of the heat exchanger parts so that "hot spots" do not develop therein. The hot combustion products passing through the ducts 36 heat the copper fins 40, which in turn transfer this heat to the air which passes through the housing 10 into the passenger compartment of the vehicle. Generally, it will be found desirable to mount baffles in the ducts 36 and to line the ducts with a suitable ceramic compound, as suggested previously.

A suitable operating system may be provided for automatically operating the heater. Such a system has not been illustrated herein except to the extent necessary for explaining the present invention. From the foregoing description, however, it is apparent that certain thermostatic devices are needed to control the operation of the electrical solenoid valves 88 (two of which are illustrated respectively in Figs. 3 and 6). These thermostatic devices may be in the form of bimetallic switches located in proximity to the vaporizer block 32 or within the combustion space 34. One of these switches may control also the energization of the igniter coil 122. There will also be a thermostatic switch responsive to the temperature of the space that is being heated for determining whether either or both of the outermost vaporizing passages 64 (Fig. 4) should be supplied with fuel. The outlet ends of these several vaporizing passages 64 (at the discs 66) may be regarded as separate burners, the center one being a pilot burner and the two outer ones being main burners. The pilot burner is supplied with fuel at a very low rate, inasmuch as it operates continuously, and it supplies the minimum thermal output of the heater. The maximum output of the heater, when both of the main burners are operating, is approximately 20,000 B. t. u. per minute.

Thus, it will be appreciated that the above described heater fulfills the objects of the invention. The housing 10, receptacle 30 and heat exchanger 20 of the heater are constructed of lightweight, relatively inexpensive material, and this heater unit is adapted to be used in conjunction with a blower unit such as 14 which likewise is of low-cost, lightweight construction. The vaporizer block 32 likewise is made of lightweight material such as cast aluminum. Also the vaporizer block 32 is situated very close to the space 34 where combustion of the fuel takes place, it is protected against overheating because of the more or less direct passage for flame and combustion products into the heat exchanger ducts 36, which avoids unnecessary back pressures. The relatively large quantity of air circulating about the aspirating devices 94 maintains these devices sufficiently cool so that the fuel is not prematurely vaporized therein. Adequate air is applied through the aspirators 94, the openings 68 in the burner plate 66 and the openings 108 in the block 32 to insure complete and thorough combustion of the fuel. The vaporizer block 32 not only functions to heat and vaporize the fuel, but it also imparts a considerable amount of heat to the combustion air before it combines with the fuel. The heater can be relied upon to start quickly even in very cold weather. The igniter 110 very quickly furnishes a flame which is effective to heat the vaporizer block 32. The quantity of fuel which is supplied to this igniter is very small, and the igniter is operated with an extremely small amount of power for the short interval of time when the heater is being started. The igniter, therefore, has a long life, and it does not require a high degree of accuracy in its design or construction. The overall height of the heater structure illustrated in Fig. 2 is approximately 8 inches, and the complete unit, including the solenoid valves 88, is less than one foot high. Inasmuch as the heater unit proper is mounted on the engine side of the fire wall, with the blower unit disposed in the passenger compartment of the opposite side of the fire wall, the space occupied by the heater in either compartment is practically negligible, and the heater can be readily accommodated in all modern types of automobiles.

While the invention has been described with reference to a preferred embodiment thereof, it should be recognized that modifications are possible within the scope of the present teachings, and it is intended that all such modifications shall be included within the spirit of the appended claims.

I claim:

1. A fuel burning heater including in combination a walled receptacle, a vaporizer block disposed entirely within said receptacle and having a plurality of vaporizing passages extending therethrough and a recess on one side thereof communicating with one end of each of said passages, said one side of said vaporizer block being positioned against one wall of said receptacle so that a combustion space is formed by said recess and said one wall, a helical heat conducting vaporizer element in each of said passages, means for supplying liquid fuel to said passages, means forming an air chamber within said receptacle communicating with said passages at the ends thereof opposite said one ends, means for supplying air under pressure to said air chamber so that said air and said fuel move together through said passages about said helical elements providing a combustible fuel and air mixture in said combustion space, means for igniting said combustible mixture, and heat exchanger duct means engaging said one wall of said receptacle, said one wall having openings therein for passage of the ignited mixture from said combustion space to said heat exchanger duct means.

2. A fuel burning heater including in combination a walled receptacle, vaporizer block means disposed entirely within said receptacle and having a plurality of vaporizing passages extending therethrough and a recess on one side thereof communicating with one end of each of said passages, said one side of said vaporizer block means being positioned against one wall of said receptacle so that a combustion space is formed by said recess and said one wall, means for supplying liquid fuel to said passages, means forming a plenum chamber within said receptacle communicating with said passages at the ends thereof opposite said one ends, means for supplying air under pressure to said plenum chamber so that said air and said fuel move together through said passages, means in said passages for heating and mixing said air and fuel to provide a combustible mixture in said combustion space, means for igniting said combustible mixture, and heat exchanger duct means engaging said one wall of said receptacle, said one wall having openings therein for passage of the ignited mixture from said combustion space to said heat exchanger duct means.

3. A fuel burning heater including in combination a walled receptacle, a vaporizer block disposed entirely within said receptacle and having a plurality of vaporizing passages extending substantially parallel therethrough and a recess on one side thereof communicating with one end of each of said passages, said one side of said vaporizer block being positioned against one wall of said receptacle so that a combustion space is formed by said recess and said one wall, a helical heat conducting vaporizer element in each of said passages, means for supplying liquid fuel to said passages, means forming an air chamber within said receptacle communicating with said passages at the ends thereof opposite said one ends, means for supplying air under pressure to said air chamber so that said air and said fuel move together through said passages about said helical elements providing a combustible fuel and air mixture in said combustion space, means for igniting said combustible mixture, and heat exchanger means including a plurality of ducts engaging said one wall of said receptacle, said one wall having openings therein for passage of the ignited mixture from said combustion space to said heat exchanger means, said passages, said openings, and said ducts being in alignment providing a direct passage for said ignited mixture.

4. A fuel burning heater including in combination a receptacle having bottom and side walls, a cover closing the top of said receptacle, a vaporizer block disposed entirely within said receptacle in engagement with said bottom wall, said vaporizer block having a plurality of vertical vaporizing passages extending therethrough and a recess on the bottom face thereof forming with said bottom wall a common space with which all of said passages communicate, fuel metering means on said cover for supplying liquid fuel to said passages, means forming a plenum chamber within said receptacle above said vaporizer block and having openings communicating with said passages at the top ends thereof, means for supplying air under pressure to said plenum chamber so that said air and said fuel move together through said passages, means in said passages for heating and mixing said air and fuel to provide a combustible mixture in said combustion space, means for igniting said combustible mixture, and heat exchanger duct means engaging said bottom wall of said receptacle, said bottom wall having openings therein for passage of the ignited mixture from said combustion space to said heat exchanger duct means.

5. A fuel burning heater including in combination a receptacle having bottom and side walls, a cover closing the top of said receptacle, a vaporizer block disposed entirely within said receptacle in engagement with said bottom wall, said vaporizer block having a plurality of vertical vaporizing passages extending therethrough and a recess on the bottom face thereof forming with said bottom wall a common space with which all of said passages communicate, fuel metering means on said cover for supplying liquid fuel to said passages, means forming a plenum chamber within said receptacle above said vaporizer block and having openings communicating with said passages at the top ends thereof, means for supplying air under pressure to said plenum chamber so that said air and said fuel move together through said pasages, means in said passages for heating and mixing said air and fuel to provide a combustible mixture in said combustion space, means for igniting said combustible mixture, said bottom wall having openings therein aligned with said vaporizing passages and heat exchanger means engaging said bottom wall of said receptacle including a plurality of ducts aligned with said openings in said bottom wall so that a direct path is provided for said mixture from said vaporizing passages through said combustion space to said heat exchanger ducts.

6. A fuel burning heater including in combination a walled receptacle, a vaporizer block disposed entirely within said receptacle and having a plurality of vaporizing passages extending therethrough between opposite faces thereof, one of said faces having a recess therein with said one face being positioned against one wall of said receptacle to form a common combustion space therebetween, means forming a chamber within said receptacle including a plate engaging the face of said vaporizer block opposite to said one face, said plate having openings therein communicating with said passages in said vaporizer block, means for supplying liquid fuel adjacent said openings, means for supplying air under pressure to said chamber so that said air and said fuel are forced through said openings into said passages, means in said passages for heating and mixing said air and fuel therein so that a combustible mixture is provided in said combustion space, means for igniting said combustible mixture, and heat exchanger duct means engaging said one wall of said receptacle, said one wall of said receptacle having openings therein for passage of the ignited mixture from said combustion space to said heat exchanger duct means.

7. A fuel burning heater including in combination a walled receptacle, a vaporizer block disposed entirely within said receptacle and having a plurality of vaporizing passages extending therethrough between opposite faces thereof, one of said faces having a recess therein with said one face being positioned against one wall of said receptacle to form a common combustion space therebetween, means forming a chamber within said receptacle including a plate engaging the face of said vaporizer block opposite to said one face, means for supplying air under pressure to said chamber, said plate having openings therein communicating with said passages in said vaporizer block, aspirating devices at one of said openings communicating with each of said passages, fuel metering means for supplying liquid fuel to said aspirating devices, means in said passages for heating and mixing said air and fuel provided therein so that a combustible mixture is delivered to said combustion space, means for igniting said combustible mixture, and heat exchanger duct means engaging said one wall of said receptacle, said one wall of said receptacle having openings therein for passage of the ignited mixture from said combustion space to said heat exchanger duct means.

8. A fuel burning heater including in combination a walled receptacle, a vaporizer block disposed entirely within said receptacle and having a plurality of vaporizing passages extending therethrough between opposite faces thereof, one of said faces having a recess therein with said one face being positioned against one wall of said receptacle to form a common combustion space therebetween, means forming a chamber within said receptacle including a plate engaging the face of said vaporizer block opposite to said one face, said plate having openings therein communicating with said passages in said vaporizer block, fuel metering means for supplying liquid fuel adjacent said openings, means for supplying air under pressure to said chamber so that said air and said fuel are forced through said openings into said passages, means in said passages for heating and mixing said air and fuel therein so that a combustible mixture is provided in said combustion space, and means for igniting said combustible mixture.

9. A fuel burning heater including in combination, a walled receptacle, vaporizer block means disposed entirely within said receptacle and having a plurality of vaporizing passages extending between opposite faces thereof and a recess on one face thereof communicating with one end of each of said passages, said one face of said vaporizer block means being positioned against one wall of said receptacle so that a combustion space is formed by said recess and said one wall, vaporizer elements respectively disposed in said vaporizing passages including an outer heat conducting spiral portion and a central tubular portion, a plate on the face of said vaporizer block means opposite to said one face forming with said receptacle a plenum chamber, said plate having a first group of openings communicating with said spiral portions of said vaporizer elements, a second group of openings communicating with said central portions of said vaporizer elements, and a third opening communicating with the space within said walled receptacle about said vaporizer block means, means for supplying liquid fuel adjacent said first group of openings, means for supplying air under pressure to said plenum chamber so that air and fuel move together through said first openings into said spiral portions of said vaporizer elements and are heated and mixed therein and delivered to said combustion space, said second group of openings providing air through said tubular portion of said vaporizer elements to said combustion space providing additional air for combustion, said vaporizer block means having at least one opening therein extending between said combustion space and the space about said vaporizer block means providing a passage for air from said third opening into said combustion space.

10. In a heater of the internal combustion type adapted to utilize liquid fuel, a receptacle including means forming a plenum chamber therein for combustion-supporting air, means for supplying air under pressure to said plenum chamber, a vaporizer block in said receptacle having fuel vaporizing passages therein communicating on one side of said block with said plenum chamber and extending to the opposite side of said block, said receptacle and said block having related wall portions defining a walled space for combustion adjoining said opposite side of said block, a heat exchanger having duct means aligned with said vaporizing passages and directly communicating with said combustion space, vaporizer elements respectively disposed in said vaporizing passages, each of said elements including an outer spiral portion and a central tubular portion extending through the vaporizing passage, means for directing liquid fuel into the outer spiral portion of each of said vaporizer elements, said plenum chamber including passages communicating individually with said spiral portions and said tubular portions of said vaporizer elements so that said outer spiral portion conducts fuel and primary air in a helical path through the vaporizing passage, and said central tubular portion conducts secondary air to said combustion space, one of the walls of said combustion space also having an additional passage therethrough for admitting tertiary air from said plenum chamber to said combustion space.

HARVEY KORSHAK.

REFERENCES CITED

The following references are of record in the file of this patent:

UNITED STATES PATENTS

| Number | Name | Date |
|---|---|---|
| 1,059,611 | Jordan | Apr. 22, 1913 |
| 2,373,766 | McCollum | Apr. 17, 1945 |
| 2,411,040 | Holthouse | Nov. 12, 1946 |
| 2,411,581 | McCollum | Nov. 26, 1946 |
| 2,440,447 | McCollum | Apr. 27, 1948 |
| 2,465,711 | Clarkson | Mar. 29, 1949 |